United States Patent
Curreri (10) Patent No.: US 6,817,027 B1
(45) Date of Patent: Nov. 9, 2004

(54) DISPLAY INTERFACE COMPRISING A CHANNEL MATRIX

(75) Inventor: Matthew R. Curreri, Medford, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,120

(22) Filed: Mar. 31, 2000

(51) Int. Cl.[7] .......................... H04N 7/16; H04N 5/445
(52) U.S. Cl. .......................... 725/28; 725/37; 725/27; 725/38; 725/47; 725/52; 725/56
(58) Field of Search ....................... 725/27, 56, 57, 725/28, 37, 38, 47, 45, 52, 25; 348/569, 460

(56) References Cited

U.S. PATENT DOCUMENTS

| | | | | |
|---|---|---|---|---|
| 5,528,304 A | * | 6/1996 | Cherrick et al. | 725/41 |
| 5,592,551 A | * | 1/1997 | Lett et al. | 380/211 |
| 5,809,204 A | * | 9/1998 | Young et al. | 386/83 |
| 5,907,322 A | | 5/1999 | Kelly et al. | |
| 6,005,601 A | | 12/1999 | Ohkura et al. | |
| 6,057,831 A | * | 5/2000 | Harms et al. | 725/38 |
| 6,125,259 A | * | 9/2000 | Perlman | 725/28 |
| 6,163,345 A | * | 12/2000 | Noguchi et al. | 348/564 |
| 6,249,320 B1 | * | 6/2001 | Schneidewend et al. | 348/569 |
| 6,766,526 B1 | * | 7/2004 | Ellis | 725/57 |
| 2003/0014753 A1 | * | 1/2003 | Beach et al. | 725/53 |
| 2003/0093813 A1 | * | 5/2003 | Shintani et al. | 725/133 |
| 2003/0179320 A1 | * | 9/2003 | Kim | 348/732 |

FOREIGN PATENT DOCUMENTS

| | | | |
|---|---|---|---|
| FR | WO 00/05886 | * | 2/2000 |
| WO | WO 98/56176 | | 12/1998 |
| WO | WO 00/04440 | | 1/2000 |
| WO | WO 00/05886 | | 2/2000 |

* cited by examiner

Primary Examiner—John Miller
Assistant Examiner—Johnny Ma
(74) Attorney, Agent, or Firm—RatnerPrestia (57) ABSTRACT

A channel matrix for use with a television receiver includes rows and columns of channel numbers, each corresponding to one channel in a group of channels. The matrix includes a group selector that is activated to display different groups of channels. The channel matrix is used to tune the television receiver, to perform other functions such as channel locking and favorite channel selection or to display channel status such as including minor channels or having certain V-chip ratings. A desired channel may be selected by navigating a cursor across the rows and columns of the matrix until the desired channel is beneath the cursor and then pressing a selection key. A channel status display, associated with the matrix, displays information about the selected channel or about the channel under the cursor before it is selected. Display enhancements include visual cues such as highlighting, underlining, and displaying of icons; audio cues; and the ability to select an entire group of channels. Display enhancements indicating channel status change in real time to reflect status changes in the channels.

20 Claims, 10 Drawing Sheets

DISPLAY INTERFACE COMPRISING A CHANNEL MATRIX

FIELD OF THE INVENTION

The invention relates generally to a display interface and more specifically to a display interface comprising a channel matrix.

BACKGROUND OF THE INVENTION

The number of television programs that a viewer may receive at any given time has increased geometrically in the last few years. Conventional analog television systems such as those conforming to the National Television Standards Committee (NTSC) and Phase Alternate Line (PAL) standards transmit one program per 6 MHz or 8 MHz channel. Recently, digital television signal processing techniques have been developed that allow multiple programs to be transmitted in each 6 MHz channel. Furthermore, there are now many sources of television signals In addition to the conventional broadcast antenna, a viewer may receive television signals via wired cable systems, several different types of satellite systems, so-called wireless cable systems and, in the near future, via a global information network, such as the Internet.

Conventional cable television systems are capable of delivering least 140 six MHz channels and some systems are capable of delivering over 200 channels via a coaxial cable. Presently, new technology is being investigated to increase the number of programs that can be delivered to the home. This is being done via two technologically strategic moves. The first is to increase the allocated bandwidth to 1 GHz (which provides for 150, 6 MHz channels). The second is to use video compression to configure a channel to carry up to 10 minor channels in one 6 MHz wide channel. Channels that include a plurality of minor channels are also known as multiprogram channels. Typical numbers that are used in the industry estimate that about 500 programs can be delivered to the home over a single coaxial cable. Fiber optic cable provides many times the bandwidth of a coaxial cable and promise to be able to provide several thousand programs. In the same way, increased bandwidth for satellite systems may allow a viewer to receive upwards of one-thousand six MHz channels, each channel containing up to ten minor channels.

It is difficult, however, for a viewer to sort through this large number of programs. Problems are already being felt where subscribers searching through 140 programs, much less 500 or 1000. To address this problem, many of the newer television systems have on-screen menus that present the program selections organized by type. One such system uses a dedicated channel to display program schedule information. To view the information, the viewer simply tunes to the dedicated channel. The advantage of such a system is that it is relatively easy to deploy because it is centrally implemented at the transmission head-end. No additional electronics or software is required at the viewer location because full control of the display is maintained at the transmission head-end. The display information is then broadcast continuously on a dedicated channel. The television viewer simply tunes the cable converter box or television tuner to the channel on which the schedule information is displayed to view the program listings. Typically, these program guides utilize a scrolling display of television listings. Some systems employ a partial screen of listings with additional information in the remainder of the screen such as advertisements for movies on pay channels, pay-per-view event schedules, time and weather information, and other commercial information. These systems generally incorporate a grid or matrix to display the program schedule information, with a different row for each channel and columns representing different time slots.

Another type of electronic program guide uses software and/or hardware in the viewer's receiver to retrieve and process a television schedule database that is transmitted during a portion of a television channel (e.g. the vertical blanking interval). One such system is the Starsight™ service. A television receiver equipped to use the Starsight service periodically tunes to a guide channel, even when the receiver is turned off, to recover a schedule information database that is encoded in the vertical blanking interval of the television signal that is sent over the guide channel. The system then formats the data so that it may be displayed to the viewer as a hierarchical set of on-screen menus. These menus allow the user some flexibility in determining how the data is displayed. For example, program data may be displayed by type of program (e.g. sports, drama, comedy). Alternatively the viewer may select only a few favorite channels for which data are displayed.

Even with this amount of interaction, existing electronic program guide (EPG) systems may be frustrating for a viewer, especially one who has access to a large number of channels, because only a relatively small number (e.g. 10) can be viewed at any one time. If, for example, a viewer is connected to a fiber optic cable system or to a combination of a broadcast antenna, satellite dish and cable system and can receive 500 to 1000 programs, 50 to 100 screens would be needed to display all of the possible options. In addition, existing EPG systems are still somewhat difficult to use and lack features that may make them aesthetically pleasing. These deficiencies contribute to their limited use by viewers and general preference for printed television schedules.

Effective menu systems, however, are a requirement in the age of digital television. Due, in part, to the compression techniques used to squeeze up to ten standard definition television (SDTV) programs into one six MHz channel, switching among channels takes much more time on a digital receiver than on an analog receiver. It may take, for example, three or four seconds between the time the viewer selects a new program and the time any image information for that program is displayed on the receiver.

In addition, many viewers may find a continuously scrolling program guide difficult to read because their eyes must follow the listings as they move up the screen. Compounding this problem is the tendency to use scrolling listings in a split screen format together with advertisements, promotional information and other information. It may be frustrating for viewers to be forced to continuously view this information while they are waiting for the schedule information for a desired channel to appear on the display.

Another possible reason why electronic program guides are underutilized is they simply are boring to watch. While a full screen of listings allows for the display of more schedule information at one time and thus a shorter cycle time through the entire program schedule, viewers could be bored by the monotony of continuously viewing a full screen of listings. As indicated above, however, split screen program guides that simultaneously display additional information of possible interest to the viewer have the disadvantage of much longer cycle times.

Accordingly, there exists a need for an improved technique of displaying program information in order to make program schedule grids more readable and manageable.

There also exists a need for providing a more aesthetically pleasing display environment for the program schedule information, and more flexible display formats. There is also a particular need for a display system that can efficiently provide the above for a system comprising several hundred to several thousand channels.

SUMMARY OF THE INVENTION

The present invention is embodied in a display interface comprising a channel matrix having n rows and m columns, a channel matrix status portion, and a selected channel status portion. The channel matrix simultaneously displays selectors for up to n×m channels. The channel matrix status portion displays channel matrix information and allows the viewer to select a channel from the matrix. The selected channel status portion displays selected channel information and allows the viewer to select channel parameters.

According to one aspect of the invention, the interface also includes a function select portion that displays a set of functions and allows the viewer to select function parameters.

Alternate embodiments of the invention include color-coding, other visual cues, and audio cues as a means for selecting channels and parameters.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DESCRIPTION OF THE INVENTION

Figure 1:
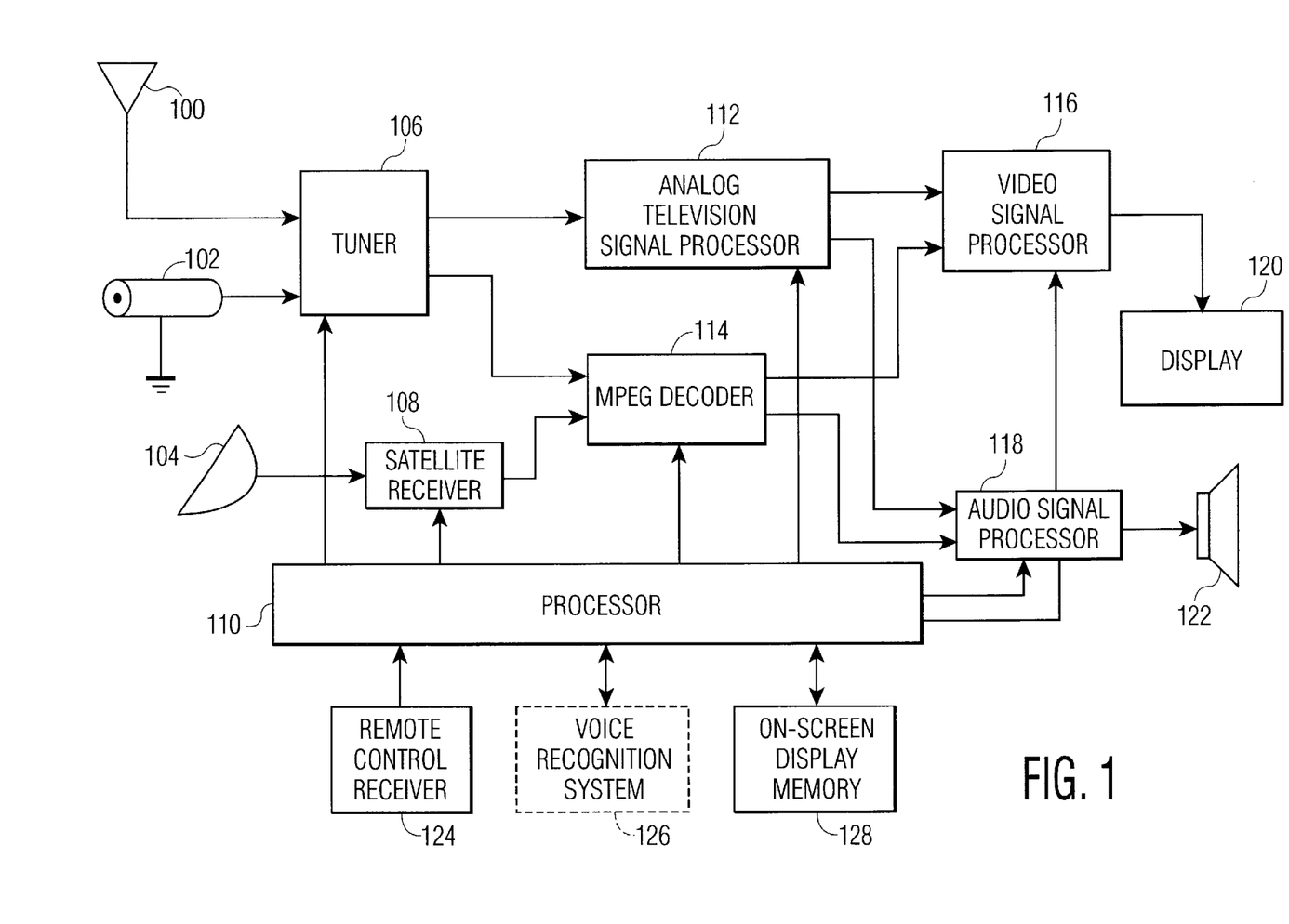
FIG. 1 is a block diagram of an exemplary television system in which the present invention may be implemented.

FIG. 1 is a block diagram of a television receiver system that includes an exemplary embodiment of the invention. The television receiver includes a tuner 106 that is coupled to receive radio frequency input signals from an antenna 100 and/or a cable connection 102. The system also includes a satellite receiver that receives television signals encoded according to the standard specified by the Moving Picture Experts Group (MPEG). Both the tuner 106 and the satellite receiver 108 are controlled by a processor 110. The exemplary tuner 106 may receive analog television signals or signals encoded according to the standard specified by the Advanced Television Systems Committee (ATSC). This standard is a subset of the MPEG standard. The tuner provides analog television signals to an analog television signal processor 112 and provides ATSC encoded television signals to an MPEG decoder 114. Other MPEG encoded signals provided, for example, by the satellite receiver 108 coupled to satellite dish 104 are also provided to the MPEG decoder 114. Both the analog television signal processor 112 and the MPEG decoder 114 provide analog video and audio output signals. The video output signals are applied to a video signal processor 116 while the audio signals are applied to an audio signal processor 118. The video signal processor 116 generates video images for display on a display device 120 while the audio signal processor 118 generates accompanying sounds through a speaker system 122.

The processor 110 receives remote control commands via a remote control receiver 124. This receiver may be a conventional infra-red or ultrasonic remote control receiver. The processor may also be coupled to an optional voice recognition system 126 (shown in phantom) that may be used to receive voice commands from a viewer, as described below. Finally, the exemplary television system includes an on-screen display memory 128 in which the processor 110 may build the menus and channel matrixes described below. The processor 110 is coupled to the video signal processor 116 to display these menus either on a blank screen or as an overlay on the video images that are currently being displayed.

Figure 2:
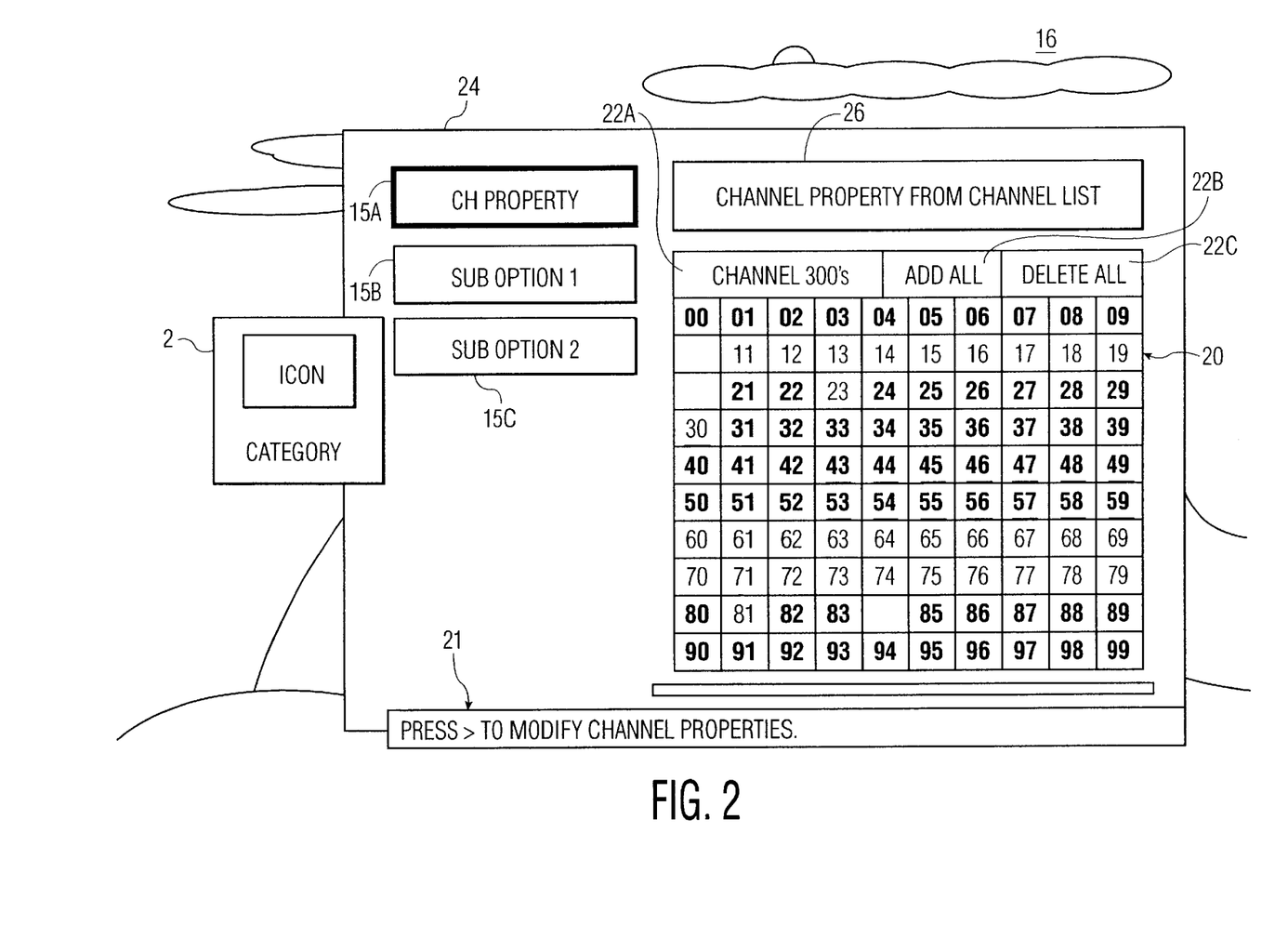
FIG. 2 is graphic depiction of a channel matrix display format having general application.

As previously stated, the large number of channels available to a viewer requires alternate methods for displaying channel data. A method according to the invention overcomes this problem by using a channel matrix. FIG. 2 is a graphical depiction of an exemplary embodiment of a channel matrix 20 with a video image background 16. The exemplary channel matrix may be used with a number of different functions in the television receiver. The image shown in FIG. 2 may be displayed, for example, when the viewer selects such a function from a higher level menu (not shown). This screen allows a viewer to 1) determine which channels are in a particular state that is relevant to the function and 2) to modify that status on a channel-by-channel basis or for a group of channels.

The channel matrix 20 shown in FIG. 2 is a part of a channel function control display 24. The display 24 also includes, a selected channel status portion 26, a channel function category icon 2 and A channel property selector 15A and one or more sub option selectors 15B and 15C. Finally, FIG. 2 shows a text item 21 indicating a command that may be entered by the viewer to perform the selected function. In this example, the text item 21 indicates that to modify the channel property corresponding to the function, the viewer must press the right arrow key on the remote control.

The channel function control display 24 may be used to control a number of aspects of the television receiver. It may be used, for example, to lock specific channels (e.g. to prevent underage viewers from being able to access adult programming), to add channels to or remove channels from a favorite channels list, to show channels that are currently broadcasting a particular type of programming, to show V-chip rating information on a channel-by-channel basis for each channel in the matrix, or simply to tune the television receiver.

Channel matrix 20 comprises n columns and m rows for displaying n×m channels numbers. In FIG. 2, a 10×10 matrix is shown for illustrative purposes. The channels are divided into groupings based on information contained in the channel matrix group indicator 22A. Because the exemplary embodiment of the invention displays up to 100 channels at a time in the matrix 20, the value in group indicator 22A indicates a base channel number corresponding to the 00 entry of the matrix. Thus, the channel matrix shown in FIG. 2 displays the status of the channel property identified by selector 15A for channel numbers 300 through 399.

The information displayed in the channel grid area 20 is indicated by highlighting one of the selectors 15A, 15B and 15C. If one of the sub-option selectors 15B and 15C is selected instead of the selector 15A, the channel grid area 20 may display other types of information, that may or may not be in the form of a channel grid. All of the displayed information in a given channel function control display 24, however, relates to a particular channel function category as indicated by the icon 2.

In the channel grid 20, individual channel indicators are displayed at the intersection of each row and column. If a number is displayed, the channel is available. If no number is displayed at a matrix position, the channel corresponding to that position is not available for any change in its properties. For example, in FIG. 2, channel 00 is available, but channel 10 is not. The channel matrix also displays the property status of each available channel. In the exemplary display shown in FIG. 2, channels 0–9, 21, 22, 24–29, 31–59, 80, 82, 83 and 85–99 are shown as bold numbers to indicate that the have the channel property indicated by the selector 15A while the remaining channels, that do not have the indicated property, are shown in normal font. It is contemplated that other methods may be used to indicate the status of the individual channels. For example, the channel numbers corresponding to channels that have the property may be colored red while channels that do not have the property are colored green.

FIGS. 2A through 7 are a channel matrix displays similar to that shown in FIG. 2 that illustrate the operation of the channel matrix with respect to a specific channel property, locking. It is emphasized, however, that the channel grid 20 may be used in the television receiver for many other functions and to display many other properties of the channels.

Figure 2A:
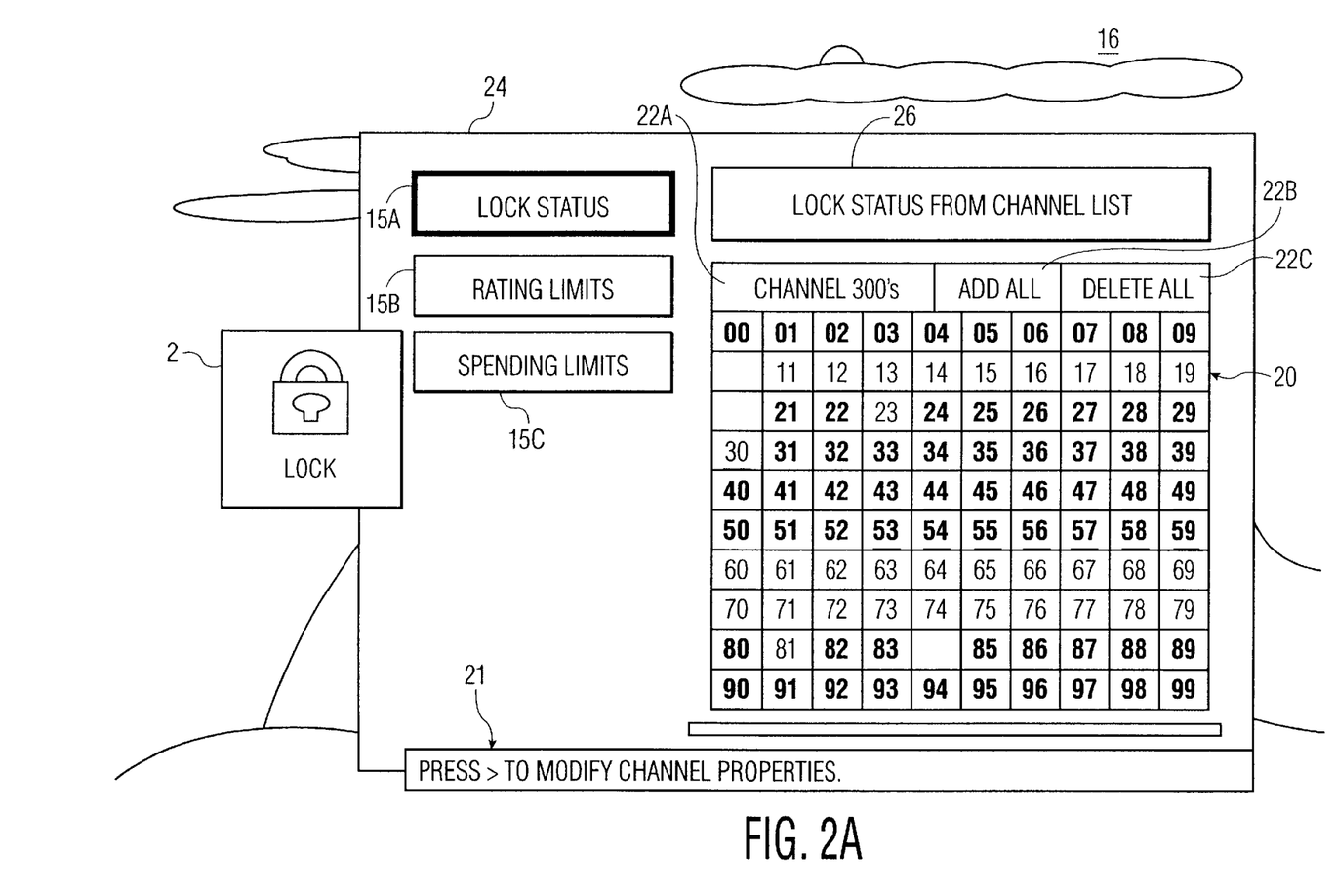
FIGS. 2A, 3, 4, 5, 6 and 7 are graphical depictions of exemplary channel matrix status displays which are useful for describing the operation of the invention.

The display shown in FIG. 2A may be provided, for example, in response to the viewer pressing LOCK selector in a higher-level menu (not shown).

FIG. 2A shows the lock status and availability of channels 300 to 399. The exemplary system receives digital television signals encoded according to the MPEG standard. According to this standard, any 6 MHz channel may be configured as a single channel or as multiple minor channels. The exemplary display shown in FIG. 2A indicates the channels that include minor channels as underlined channel numbers. In the exemplary display, channels 30, 44–49 and 54–59 include minor channels. All other channels have only one program. In the exemplary embodiment of the invention, an entire channel may be locked or individual minor channels in the channel may be locked. To indicate that a channel has both locked and unlocked minor channels, the display may show the channel in a different font, for example, italics (not shown) or in a different color, for example, yellow (not shown).

Figure 3:
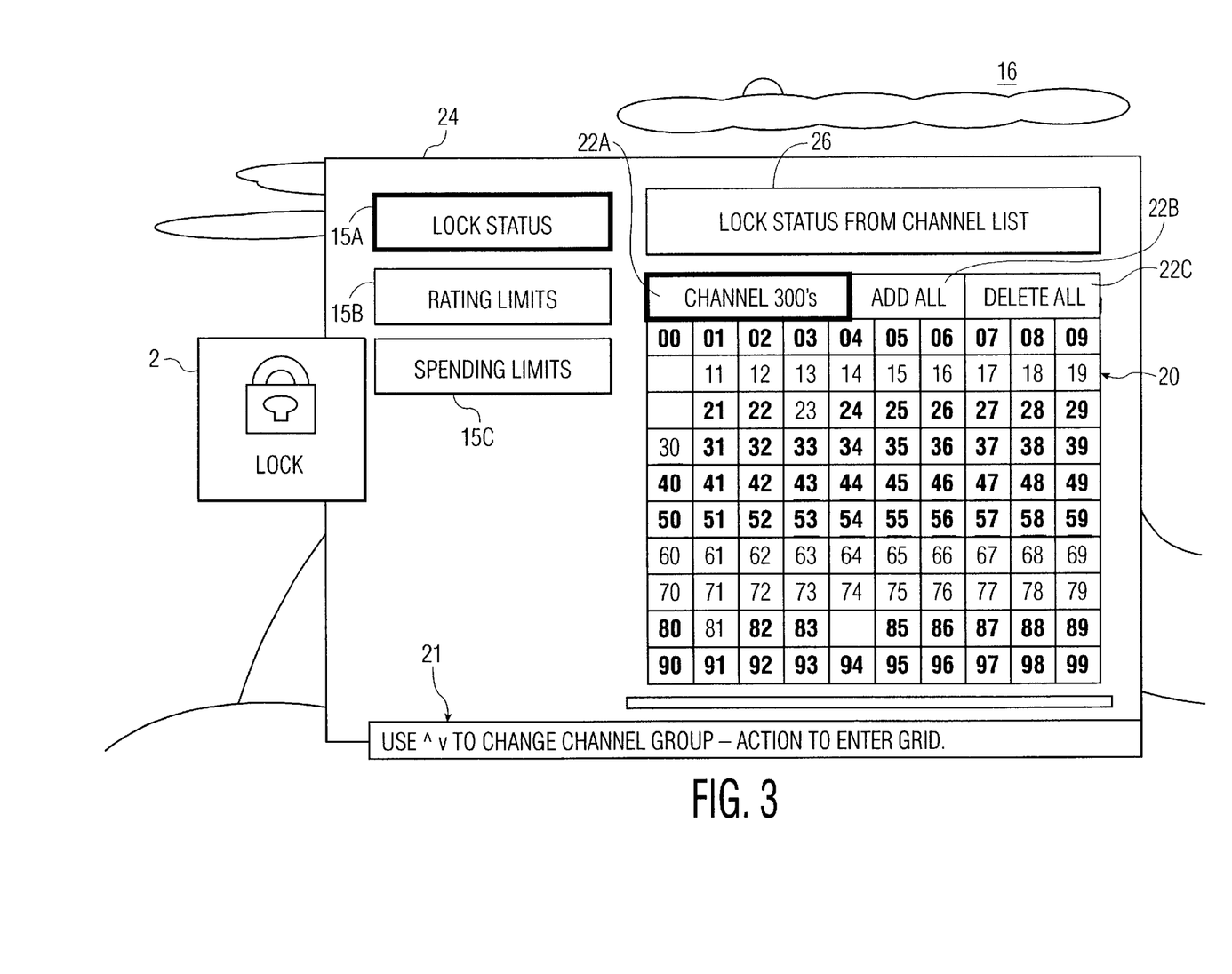
Figure 4:
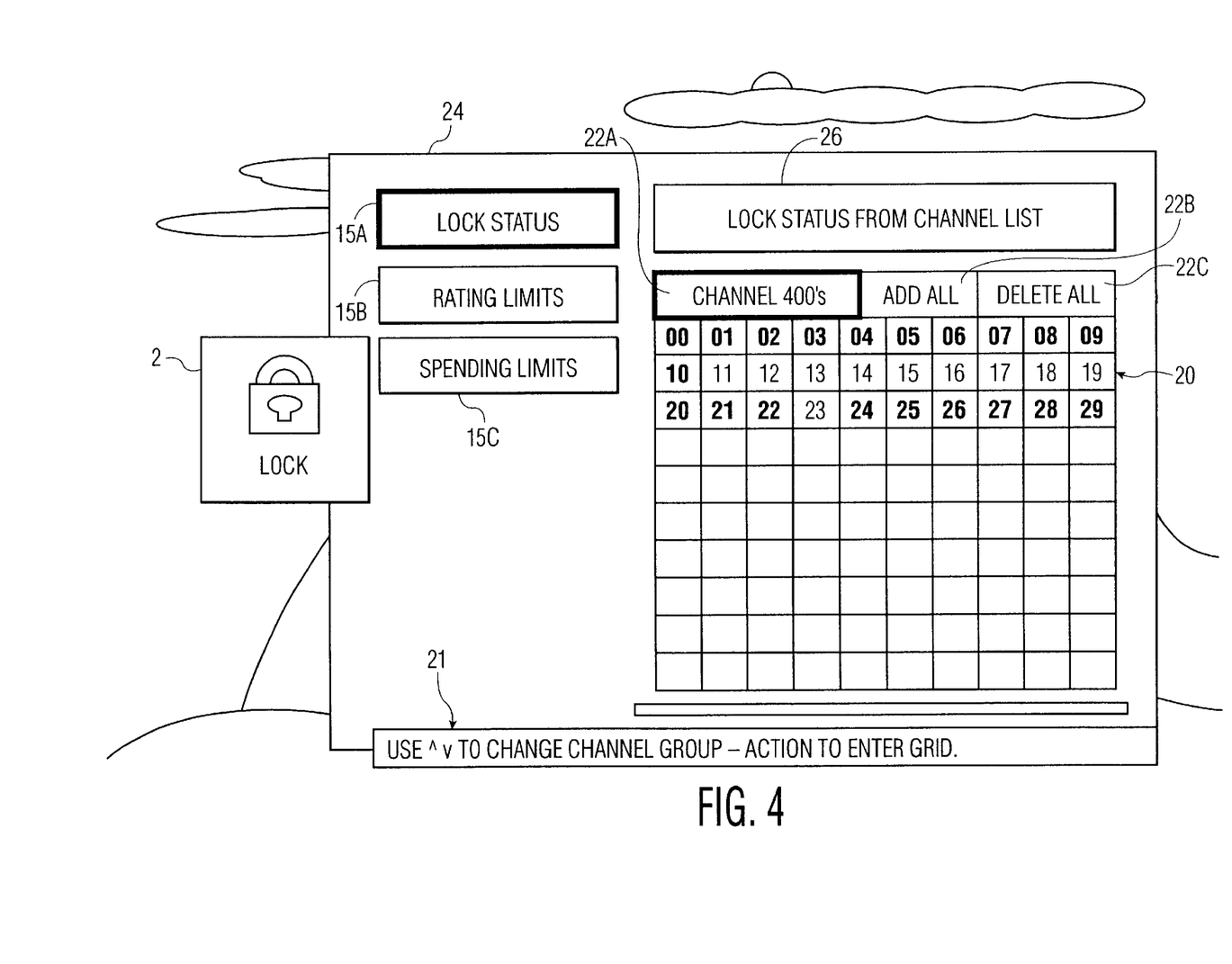

To modify the lock status of individual channels in the channel list from the display shown in FIG. 2A, the viewer presses the right arrow key. The resulting display is shown in FIG. 3. In this display, channel group indicator 22A is highlighted and the command message 21 is modified to indicate that if the viewer presses the up or down arrow keys, the group of channels represented by the matrix 20 will change. If, for example, the viewer presses the up arrow key, the display shown in FIG. 4 is generated. This screen shows the availability, lock status and multi-program status of channels beginning with channel 400. In this display, the channel group indicator 22A indicates a base channel number of 400. In addition, only channel numbers 0 through 29 are shown in the channel matrix 20 indicating that, in the exemplary system, the highest channel number is 429.

Referring to FIG. 3, if instead of pressing the right arrow key, the viewer presses the ACTION key to select the channel group beginning with channel 300, and then the right arrow key, the selector 22B would be highlighted (not shown). By then pressing the ACTION key again, the viewer may simultaneously lock all of the channels displayed in the matrix 20, beginning with channel 300. If, instead of pressing the ACTION key, the viewer presses the right arrow key a second time, the selector 22C is highlighted (not shown). By pressing the ACTION key when this selector is highlighted, the viewer may simultaneously unlock all of the displayed channels beginning with channel 300.

In an alternative embodiment of the invention, pressing the ACTION key when the selector 22B or 22C is highlighted adds or removes the property status, respectively from all of the channels in all channel grids. In the exemplary embodiment shown in FIG. 3, this action would lock or unlock all of the channels form 0 to 429.

This function is particularly useful if a satellite broadcaster or cable company transmits similar types of programs in a block of channels. For example, with reference to FIG. 3, a broadcaster could decide to transmit all of its X-rated movies in the 300's channel block (i.e., channels 300 through 399). Thus a viewer can position the cursor on the "Lock All" selector 22B and press the ACTION key to lock all channels displayed in the channel matrix.

Figure 5:
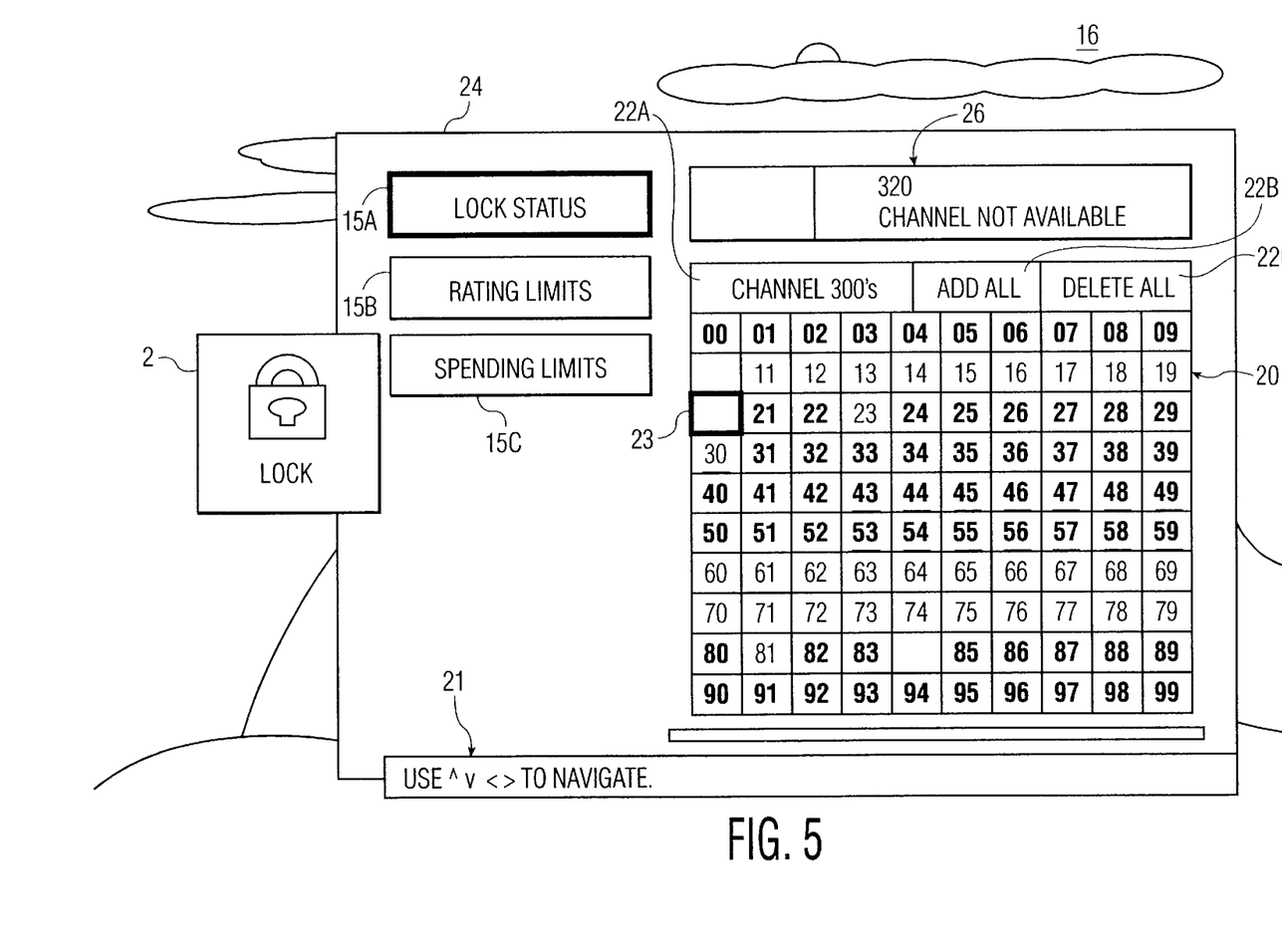

If, from the display shown in FIG. 3,the viewer presses the ACTION key to select the channel group beginning with channel 300, and presses the down arrow key three times, the display shown in FIG. 5 is provided. This figure illustrates the attempt to select a channel that is not available. Note that, in FIG. 5, the space for channel 20 is blank, indicating that this channel is not available. That is to say, it can not be received by the television receiver. When the viewer, using the arrow keys, positions the cursor 23 over the position for channel 20, the status display 26 changes to indicate that channel 20 is not available. When the cursor is active in the channel matrix, the command message 21 changes to indicate that the up, down, left and right arrows may be used to navigate through the matrix.

In the exemplary embodiment of the invention, the cursor 23 is shown as an open square surrounding the channel number. It is contemplated, however, that the cursor may take many different forms. It may be, for example a blinking bar beneath or above the channel number or a transparent colored square that changes the color of the channel number when positioned over the number. The positioning of the cursor may also be indicated by changing the brightness of the channel number as the cursor is moved from number to number in response to the navigation keys.

Figure 6:
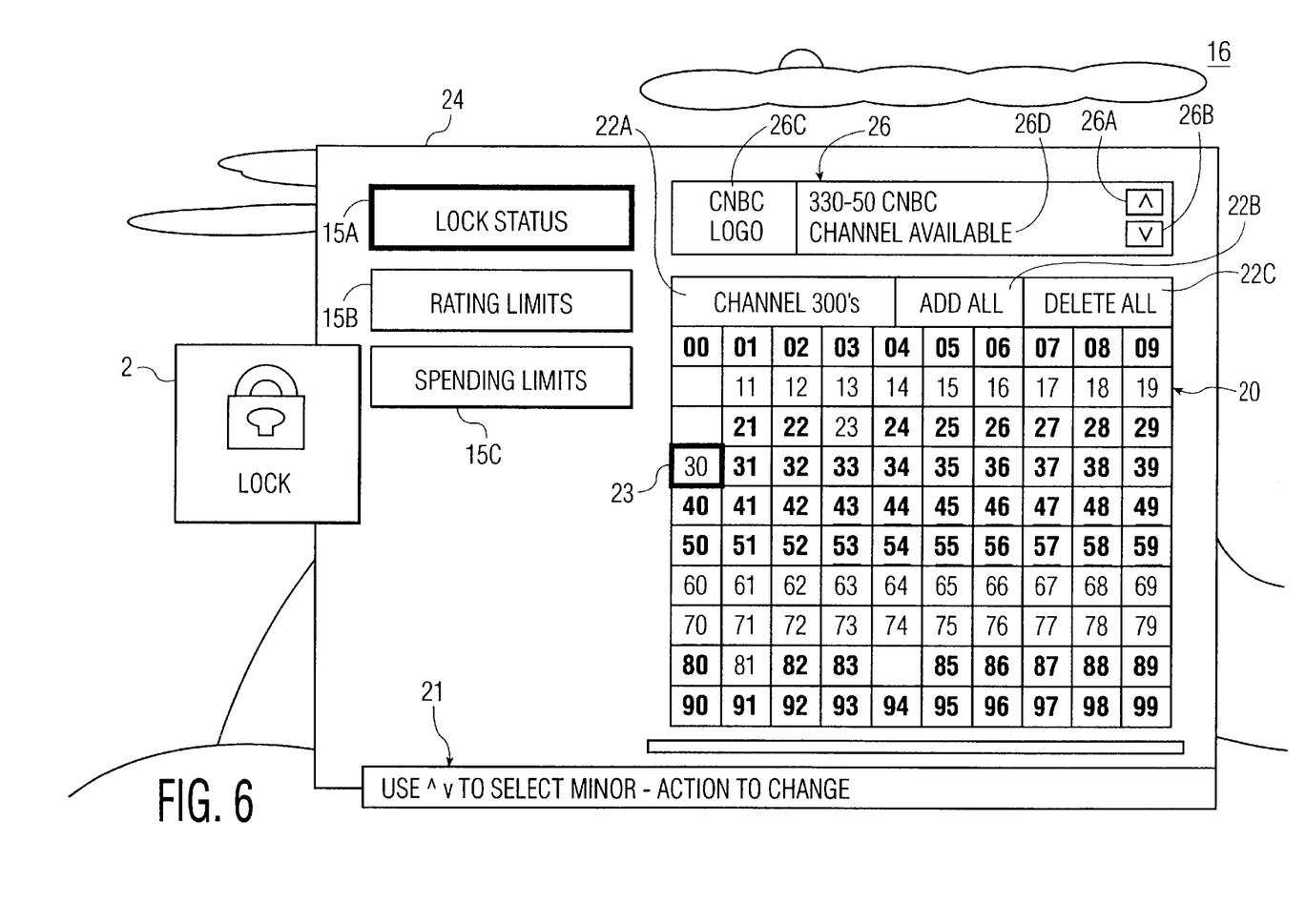

If, when the image of FIG. 5 is displayed, the viewer presses the down arrow key, the screen shown in FIG. 6 is displayed. By moving the cursor 23 down one row, the viewer highlights channel 30 which, as indicated by the underline, includes minor channels (i.e. is a multi-program channel). In this instance, channel 30 has at least two minor channels, 50 and 89. When the viewer first selects a program channel, the minor channel having the lowest number is displayed. In this instance, minor channel 50 is a CNBC™ presentation. This is indicated by an icon 26C in the channel status area 26 along with text 26D indicating that the minor channel is available (i.e. not locked). In addition, the channel status area includes two items 26A and 26B which indicate keys that the viewer may press to view other minor channels in the selected channel. In the exemplary embodiment of the invention, these indicators are the up and down arrows.

Figure 7:
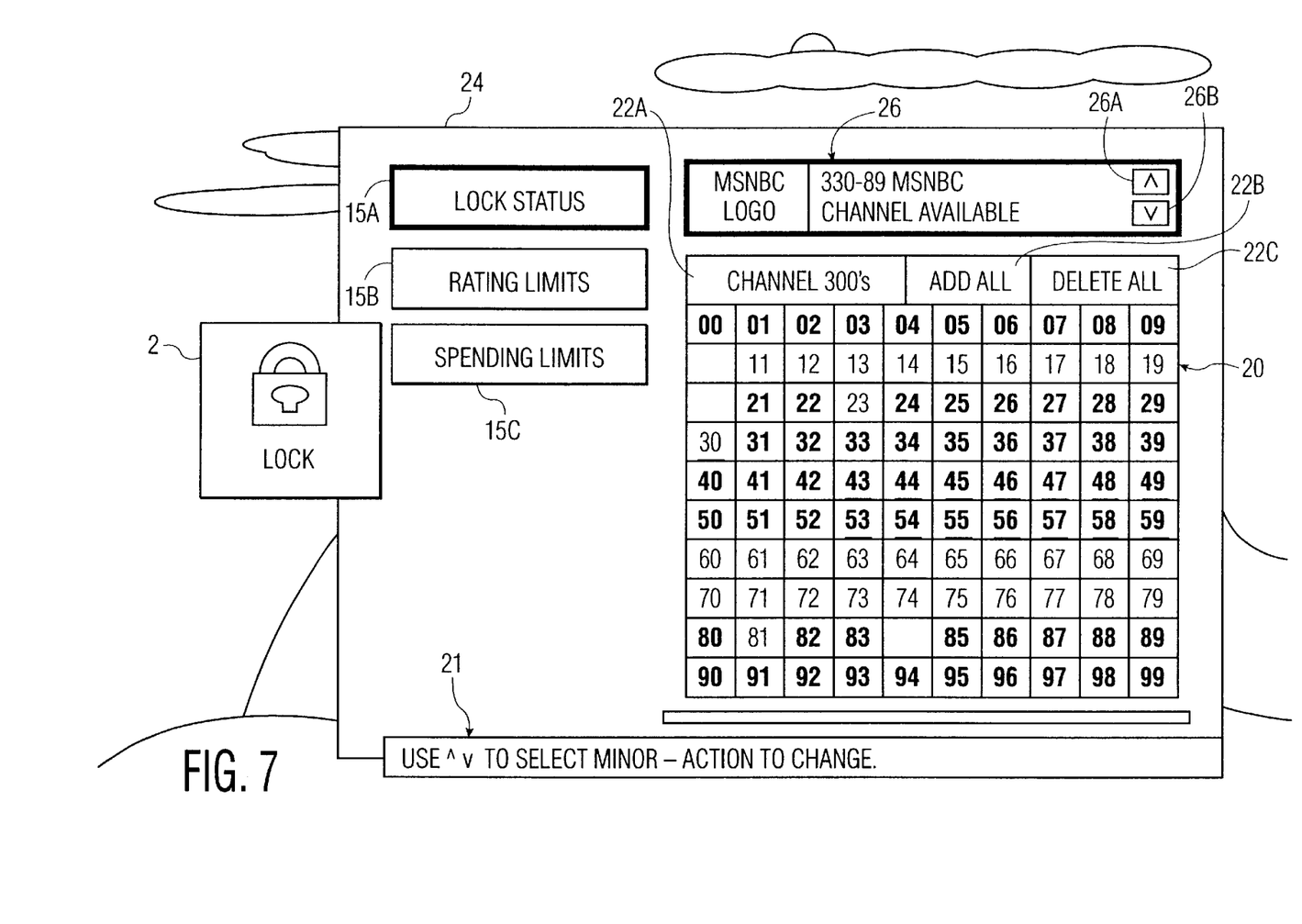

The command message 21 also changes when the cursor is positioned on a multi-program channel to indicate that the minor channels may be selected using the up and down arrows. Thus, in this exemplary embodiment of the invention, once the cursor is positioned on a multi-program channel, pressing the INFO key on the remote control shifts the focus to highlight the channel status area 26, as shown in FIG. 7. The channel status area 26 is highlighted, pressing the up and down arrows on the remote control causes the display 26 to progress through the minor channels. If the viewer wants to return to the matrix 20, the viewer presses the INFO key again. While the exemplary embodiment of the invention shows using the up arrow key to display the status of the next higher minor channel and using the down arrow key to display the status of the next lower minor channel. Alternatively, to follow the channel progression of the matrix 20 with the lowest numbered channel being at the top of the matrix and the highest numbered channel being at the bottom of the matrix, the functions of the arrow keys may be reversed.

In this exemplary embodiment, when the cursor is positioned on a multi-program channel, pressing the left or right arrow key on the remote control moves the cursor to the previous or next channel in the matrix 20 regardless of which minor channel is displayed in the area 26.

When the user is navigating in the channel matrix, the command message 21 instructs the viewer to presses the ACTION key to toggle the locked status of the channel. If, when viewing the display shown in FIG. 7, the user presses the ACTION key, the status of minor channel 89 of channel 330 is changed to Locked (not shown). When minor channel 89 of channel 330 is locked, the channel number 30 in the matrix 20 changes to indicate that the minor channel is locked. In the exemplary embodiment of the invention this is indicated by changing the font of the channel number 30 to be bold (not shown). As set forth above, a change of this type may also be indicated in many different ways, for example by changing the color of the number to yellow or changing the number to an italic font. In addition, it is contemplated that the color of the text item 26D may be changed to reflect the change in status. For example, the text "Channel Locked" may be red while the text "Channel Available" may be green. The text "Channel not Available," shown in FIG. 5, and any other text that does not indicate the lock status may be a different color, for example, black.

Although the exemplary embodiments of the invention have been shown in terms of a channel lock command, it is contemplated that the channel matrix may be used with other functions of a television receiver. The channel matrix may, for example, be used to help a viewer more quickly generate and maintain a favorite channels list. The screen displays and operation of the menu system would be much the same as for the channel locking function. A sub option of the favorite channels property may be, for example, the viewer's name so that the receiver may maintain multiple favorites lists, one for each viewer in the household.

Figure 8:
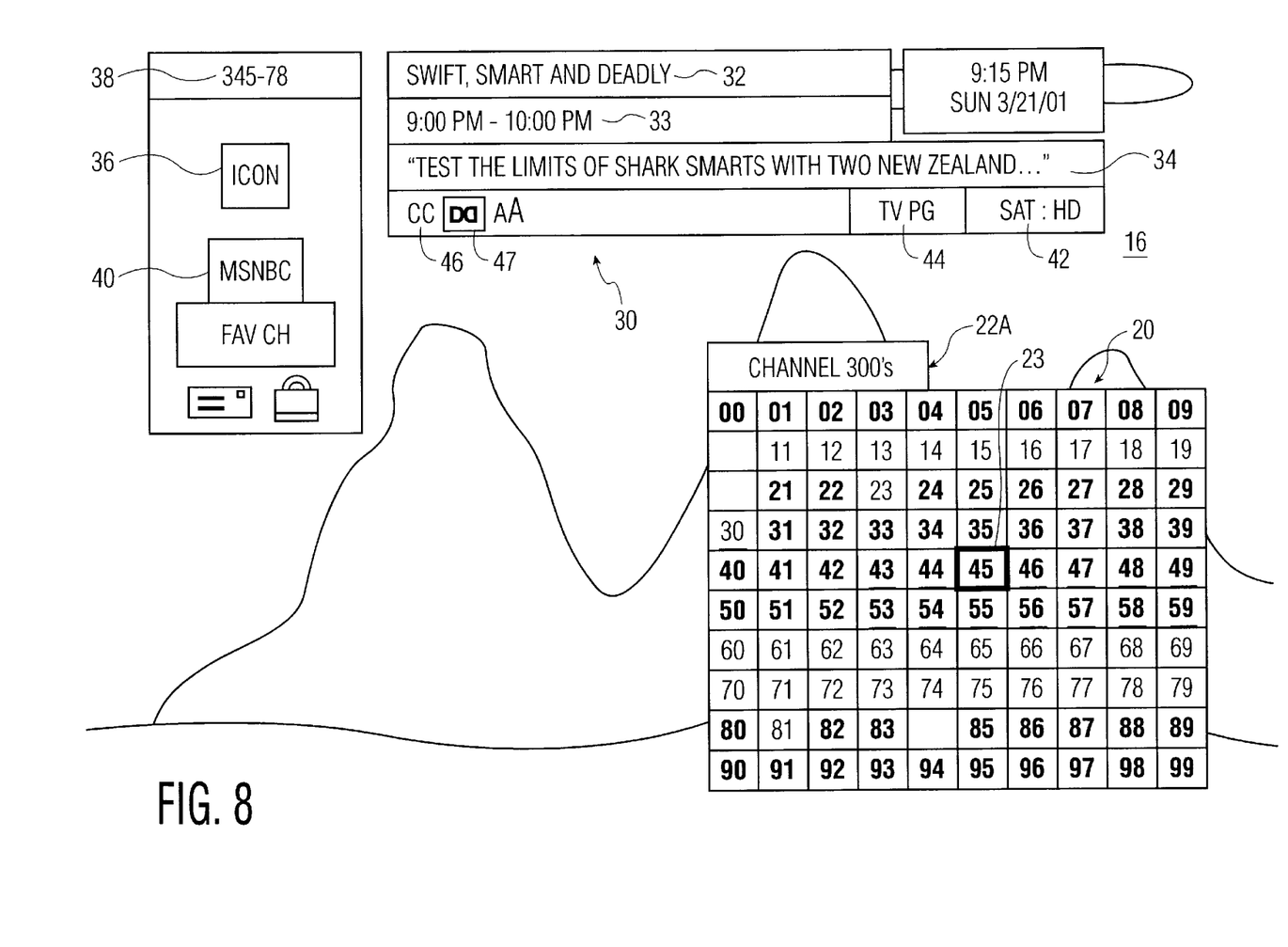
FIG. 8 is a graphical depiction of an exemplary channel matrix in an electronic program guide that displays information about a channel in the matrix.
Figure 9:
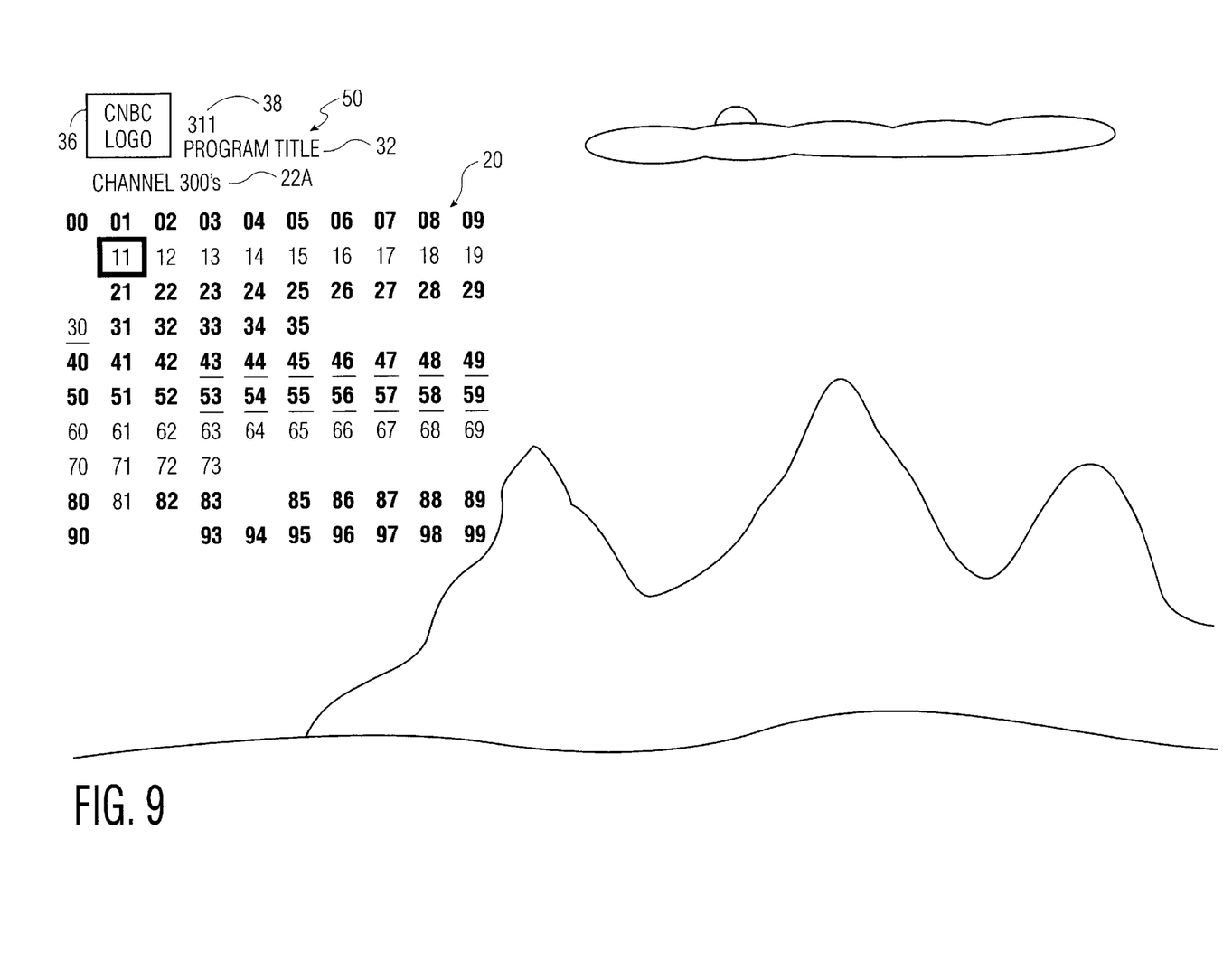
FIG. 9 is a graphical depiction of an exemplary channel matrix as it may be used to tune the television receiver.

The channel matrix 20 may also be used for channel selection to tune the television receiver. FIGS. 8 and 9 are screen diagrams that show possible implementations of a channel map 20 in a selection menu. FIG. 8 shows an example of how a channel map 20 may be used to select from among the available channels in a television system. FIG. 8 includes a video image section 16 and a channel information section 30. The displayed channel is minor channel 78 of channel 345 as indicated by the value 345-78 in the channel number field 38 and by the cursor 23 being positioned on channel number 45 in the 300 channel group, as indicated by the channel matrix group indicator 22A.

In this example, channel 345 is selected by the viewer pressing a key oil the remote control that brings up the channel matrix 20. The viewer may scroll through the channel groups by positioning the cursor 23 on the group indicator 22A and then moving the up and down arrow keys and the select a group as described above. Once a channel group is selected, the viewer may navigate through the channel matrix using the arrow keys. As the cursor 23 passes over each channel, the channel information section 30 of the display shows the title 32 of the program, its start and end time 33, a brief summary 34 of the program, an icon or logo 36 appropriate for the channel, call letters 40 for the channel and the channel number 38. In addition, the information section may display an indication 42 of the program format (e.g. high definition television (HDTV)), an indication 44 of the V-Chip rating for the program (e.g. TVPG), a closed caption symbol 46 indicating that closed caption text is available, and a Dolby™ symbol 47 indicating the audio format of the program. The background video image 16 would not change until the viewer selects a channel in the channel matrix, for example, by pressing the ACTION key while the cursor 23 is positioned over the channel number.

It is noted that the channel numbers in the channel grid shown in FIG. 9 are modified to indicate a particular property. This property may be the lock status, as described above or it may be other properties such as acceptable V-chip ratings or program content, in this instance nature shows.

Alternatively, the channel matrix may be used to tune the television receiver in a less intrusive manner, as shown in FIG. 9. In this use, the channel matrix 20 and channel information section 50 are both provided on a transparent background allowing more of the current video program to be seen while the viewer is selecting a new channel. In addition, the channel information section 50 is much more compact than the section 30 shown in FIG. 8. The section 50 includes only the channel logo 36, channel number 38, program title 32 and channel group indicator 22A. Otherwise, the selection system shown in FIG. 9 operates in the same way as the system shown in FIG. 8.

In the exemplary embodiment of the invention, the channel matrix 20 changes in real time to track changes in the status of the programs being sent through the channels. If for example, a major channel having multiple SDTV programs in respective minor channels changes to have a single HDTV program, the underline beneath the channel would disappear as soon as the change was detected.

Alternatively, if the matrix 20 is generated from an electronic program guide (EPG) database, the matrix would change at times indicated in the EPG database for the corresponding change in the television signal to occur. As another example, if the channel locking is based on V-chip ratings, the channel matrix being displayed indicates lock status, and a new program, having an acceptable V-chip rating is sent through a channel, the status of that channel would automatically be indicated as unlocked.

In view of the convergence of television and home computers, it is contemplated that a user interface according to the present invention may be implemented in software to be run on a home computer. This software may be embodied in a computer program on a computer-usable carrier such as a magnetic disk, optical disk, radio frequency carrier wave or audio frequency carrier wave.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A display interface for a television receiver comprising:
   a channel matrix having n columns and m rows for displaying a plurality of channel indicators exclusive of any other text or graphic information for at most n×m channels, where n and m are positive integers greater than 2, each channel indicator corresponding to a respectively different position in the matrix and each representing a separate frequency, wherein the channels represented by the channel matrix are one group of channels among a plurality of channel groups;
   a channel group selector configured to be activated to switch the channel matrix among the groups of channels to select a current group of channels and to display a channel indicator of a base channel in the current group of channels;
   a cursor configured to be moved to positions along the rows and columns of the matrix;
   a channel status section which displays status information on a television channel corresponding to the indicator at the position of the cursor on the matrix;
   a channel selector which selects one of the n×m channels by adding the channel indicator corresponding to the position of the cursor on the matrix to the channel indicator of the base channel.

2. A display interface in accordance with claim 1 further including a group select portion that is activated to simultaneously select all of the channels in the current group of channels.

3. A display interface in accordance with claim 1, wherein n and m equal 10 such that each group of channels includes at most 100 channels.

4. A display interface in accordance with claim 1 wherein each channel indicator in said channel matrix is color-coded to indicate the status information of the corresponding channel.

5. A display interface in accordance with claim 1, wherein the channels corresponding to the indicators in the matrix may or may not have at least one predetermined property and the channel indicators corresponding to channels having the one predetermined property are modified and channel indicators corresponding to channels that do not have the one predetermined property are not modified.

6. A display interface in accordance with claim 5, wherein the predetermined property depends, at least in part, on signals sent through the channels and the channel indicators are modified in real time as the signals sent through the channels change to indicate changes in the predetermined property for ones of the channels.

7. A display interface in accordance with claim 5, wherein the predetermined property depends, at least in part, on information about the channels contained in an electronic program guide and the channel indicators are modified at times corresponding to times at which changes in the property are to occur as described in the electronic program guide.

8. A display interface in accordance with claim 1 further including a remote control device, including at least one cursor navigation key for moving the cursor along the rows and columns of the matrix, wherein the channel selector is a further key on the remote control device.

9. A display interface in accordance with claim 1 further including a voice recognition system that recognizes voiced direction commands to move the cursor along the rows and columns of the matrix and recognizes a voiced selection command to act as the channel selector.

10. A display interface in accordance with claim 1 further including a function select portion including a plurality of functions indicators representing respective functions that may be performed on the channels represented by the channel matrix.

11. A user interface method for controlling a television receiver that is configured to receive C channels, where C is an integer, the method comprising the steps of:
   displaying a channel matrix having n columns and m rows for displaying channel indicators exclusive of any other text or graphic information for at most n×m channels, where n and m are positive integers greater than 2 and n×m is less than C, each channel indicator corresponding to a respectively different position in the matrix and each representing a separate frequency, wherein the channels represented by the channel matrix are a current group of channels selected from among a plurality of channel groups;
   displaying a channel indicator of a base channel in the current group of channels as a channel group selector;
   activating the channel group selector to switch the channel matrix among the groups of channels and to select the current group of channels;
   moving a cursor over the channel indicators in the matrix to indicate a possible selection of a channel corresponding to one of the channel indicators;
   displaying status information concerning the possibly selected channel; and
   responsive to the displayed status information, selecting one of the n×m channels by adding the channel indicator corresponding to the possibly selected channel to the channel indicator of the base channel.

12. A method in accordance with claim 11 further including the step of:
   activating the group selector to simultaneously select all of the channels in the current group of channels.

13. A method in accordance with claim 11 further including the step of color coding channel indicators among the plurality of channel indicators in said channel matrix indicate the status information of the corresponding channel.

14. A method in accordance with claim 11 wherein the channels corresponding to the indicators in the matrix may or may not have at least one predetermined property and the method further includes the step of modifying the channel indicators corresponding to channels having the one predetermined property and not modifying the channel indicators corresponding to channels that do not have the one predetermined property.

15. A method in accordance with claim 14, wherein the predetermined property depends, at least in part, on signals sent through the channels and the step of modifying the channel indicators includes the step of modifying the channel indicators in real time as the signals sent through the channels change to indicate changes in the predetermined property for ones of the channels.

16. A display interface in accordance with claim 14, wherein the predetermined property depends, at least in part, on information about the channels contained in an electronic program guide and step of modifying the channel indicators includes the step of modifying the channel indicators at times corresponding to times at which changes in the property are to occur as described in the electronic program guide.

17. A method in accordance with claim 11 further including the steps of:

displaying a function select portion including a plurality of functions indicators representing respective functions that may be performed on the channels represented by the channel matrix; and performing a function corresponding to a selected one of the plurality of function indicators when the function indicator is activated.

18. Apparatus for implementing a user interface that controls a television receiver comprising:

means for displaying a channel matrix having n columns and m rows for displaying channel indicators exclusive of any other text or graphic information for at most n×m channels, where n and m are positive integers greater than 2, each channel indicator corresponding to a respectively different position in the matrix and each representing a separate frequency, wherein the channels represented by the channel matrix are a current group of channels selected from among a plurality of channel groups;

channel group selection means for switching the channel matrix among the groups of channels to select a current group of channels and for displaying a channel indicator of a base channel in the current group of channels;

means for moving a cursor over the channel indicators in the matrix to indicate a possible selection of a channel corresponding to one of the channel indicators;

means for displaying status information concerning the possibly selected channel; and means, responsive to the displayed status information, for indicating a selection of one of the n×m channels by adding the channel indicator corresponding to the possibly selected channel to the channel indicator of the base channel.

19. Apparatus in accordance with claim 18 wherein the channels corresponding to the indicators in the matrix may have first and second configurations and the apparatus further includes means for modifying the channel indicators corresponding to channels having the first configuration and not modifying the channel indicators corresponding to channels having the second configuration.

20. A computer readable carrier including a computer program that controls a computer to implement a user interface method for controlling a television receiver, the computer program causing the computer to perform the steps of:

displaying a channel matrix having n columns and m rows for displaying channel indicators exclusive of any other text or graphic information for at most n×m channels, where n and m are positive integers greater than 2, each channel indicator corresponding to a respectively different position in the matrix and each representing a separate frequency, wherein the channels represented by the channel matrix are a current group of channels selected from among a plurality of channel groups;

displaying a channel indicator of a base channel in the current group of channels as a channel group selector;

activating the channel group selector to switch the channel matrix among the groups of channels and to select the current group of channels;

moving a cursor over the channel indicators in the matrix to indicate a possible selection of a channel corresponding to one of the channel indicators, displaying status information concerning the possibly selected channel; and responsive to the displayed status information, selecting one of the n×m channels by combining the channel indicator corresponding to the possibly selected channel to the channel indicator of the base channel.

* * * * *